(12) United States Patent
Kumar et al.

(10) Patent No.: US 7,411,902 B2
(45) Date of Patent: Aug. 12, 2008

(54) METHOD AND SYSTEM FOR MAINTAINING PARTIAL ORDER OF PACKETS

(75) Inventors: Alok Kumar, Santa Clara, CA (US); Benjamin C. Hardekopf, Austin, TX (US); Raj Yavatkar, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1008 days.

(21) Appl. No.: 10/447,500

(22) Filed: May 28, 2003

(65) Prior Publication Data

US 2004/0240473 A1 Dec. 2, 2004

(51) Int. Cl.
*H04L 12/26* (2006.01)
*H04L 12/56* (2006.01)

(52) U.S. Cl. ............... 370/230; 370/392; 370/394; 370/401

(58) Field of Classification Search ............ 370/474, 370/230
See application file for complete search history.

(56) References Cited

U.S. PATENT DOCUMENTS 6,327,625 B1 * 12/2001 Wang et al. ............... 709/235
6,862,282 B1 * 3/2005 Oden ...................... 370/394

2003/0021269 A1 1/2003 Calvignac et al.
2003/0058878 A1 3/2003 Minnick et al.

OTHER PUBLICATIONS

"PCT Search Report and Written Opinion of the International Searching Authority", PCT/US2004/014808, filed May 12, 2004.

* cited by examiner

*Primary Examiner*—Chi H. Pham
*Assistant Examiner*—Soon-Dong D Hyun
(74) *Attorney, Agent, or Firm*—Blakely, Sokoloff, Taylor & Zafman LLP

(57) ABSTRACT

A method and system for maintaining partial order of packets in packet processing modules is described. The system includes a memory and a plurality of packet processing modules to process packets that are part of a sequence in order. The memory stores a plurality of indicators, each indicator associated with one of the plurality of packet processing modules to identify which packets in the sequence are to be processed by the packet processing module and which packets in the sequence are to be skipped. The next packet in the sequence to be processed by the packet processing module is determined based on the stored indicators. A packet received at the packet processing module is processed if the packet is the next packet in the sequence to be processed.

12 Claims, 5 Drawing Sheets

| common AISR array | status bit vector for module 204 | skip bit vector for module 204 | status bit vector for module 206 | skip bit vector for module 206 |
|---|---|---|---|---|
| pointer to packet 1 | 0 | 1 | 1 | 0 |
| pointer to packet 2 | 0 | 1 | 1 | 0 |
| pointer to packet 3 | 1 | 0 | 0 | 1 |
| pointer to packet 4 | 0 | 0 | 1 | 0 |

FIG. 3

METHOD AND SYSTEM FOR MAINTAINING PARTIAL ORDER OF PACKETS

BACKGROUND

1. Technical Field

Embodiments of the invention relate to the field of packet ordering, and more specifically to maintaining partial order of packets in packet processing modules.

2. Background Information and Description of Related Art

There are various processing functions that are applied to a packet as it passes through a router. A constraint for some of these processing functions is that they must process packets within a particular flow in the order they arrived at the router. At the same time, some processing functions do not have this requirement. In a system that has modules that require order processing and modules that do not require order processing, it becomes difficult to determine which packets to wait for.

In the context of network processors, the problem of mapping an arbitrary data-flow graph with a mix of in-order and out-of-order processing requirements is especially difficult because the network processor architecture involves a distributed, multiprocessing environment. For example, nodes of a router or switch's data flow graph get mapped on multiple processing engines, where each engine implements multiple hardware threads with non-preemptive scheduling. In such a design, packets from the same flow may not be handled by the same thread. Thus, packets could arrive at modules out of order.

BRIEF DESCRIPTION OF DRAWINGS

The invention may best be understood by referring to the following description and accompanying drawings that are used to illustrate embodiments of the invention. In the drawings:

FIG. 3 is a table illustrating exemplary entries in a memory according to one embodiment of the invention.

DETAILED DESCRIPTION

Embodiments of a system and method for maintaining partial order of packets in modules are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
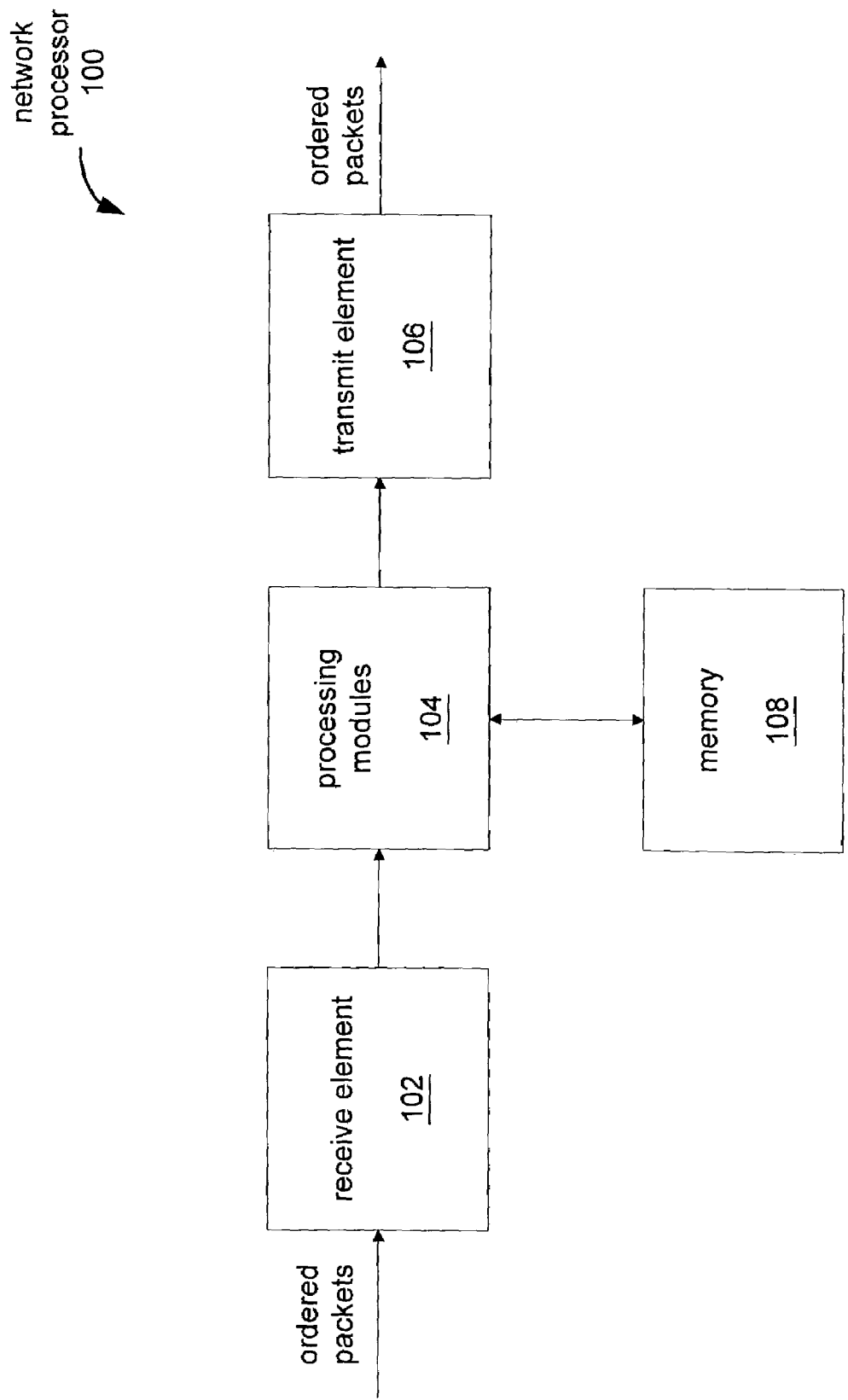
FIG. 1 is a block diagram illustrating one generalized embodiment of a system incorporating the invention.

Referring to FIG. 1, a block diagram illustrates a network processor 100 according to one embodiment of the invention. Those of ordinary skill in the art will appreciate that the network processor 100 may include more components than those shown in FIG. 1. However, it is not necessary that all of these generally conventional components be shown in order to disclose an illustrative embodiment for practicing the invention. In one embodiment, the network processor is coupled to a switch fabric via a switch interface.

The network processor 100 includes a receive element 102 to receive packets from a network. Some of these packets may be part of a sequence of packets. In one embodiment, the receive element 102 may assign a sequence number to the packets that belong to a sequence. The network processor 100 includes one or more processing modules 104. One or more of the processing modules may require the packets of a sequence to be processed in the order they were received at the receive element 102. For the processing modules that have this requirement, the memory 108 stores a plurality of indicators. Each indicator is associated with one of the packet processing modules to identify which packets in the sequence are to be processed by the packet processing module and which packets in the sequence are to be skipped. There may also be one or more indicators to specify which packets in the sequence of packets are ready to be processed by each of the packet processing modules.

These stored indicators help a packet processing module determine which packet in the sequence is the next packet to be processed. Once this determination is made, the packet processing module may proceed to process the next packet in the sequence if this packet is ready to be processed. A packet that arrives at a packet processing module out of order may be stored in the memory 108. In one embodiment, the out-of-order packet may be stored in an Asynchronous Insert, Synchronous Remove (AISR) array in the memory 108. The packets are stored in the array according to their sequence number. For example, the first packet in the sequence is stored in the first position of the array, the second packet in the sequence is stored in the second position of the array, and so on. In one embodiment, the memory 108 is a Static Random Access Memory (SRAM).

In one embodiment, there may also be stored indicators that indicate which packet processing modules have at least one packet waiting to be processed, indicators that indicate which packet processing modules have at least one packet in the right order waiting to be processed, and indicators that indicate which packet processing modules have a number of packets waiting to be processed that exceed a predetermined threshold number. These indicators help the system allocate resources according to the length of the queues.

After the packets are processed, they are transmitted by the transmit element 106 to a next network destination. Packets that are part of a sequence are re-ordered and transmitted in the same order as they were received at the receive element 102.

Figure 2:
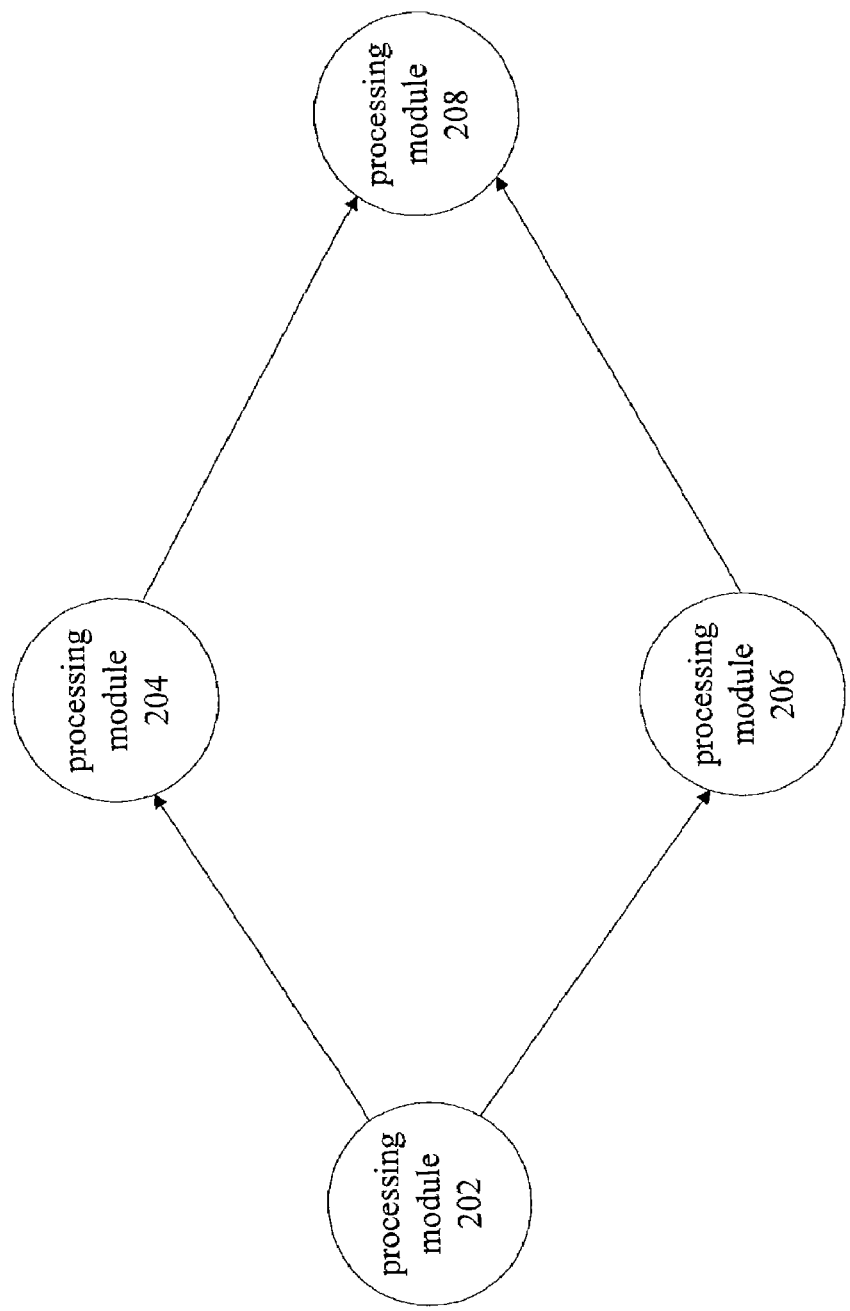
FIG. 2 is a diagram illustrating an exemplary arrangement of packet processing modules according to one embodiment of the invention.

FIG. 2 is a diagram illustrating an exemplary arrangement of packet processing modules according to one embodiment of the invention. In this example, the network processor 100 includes four packet processing modules 202, 204, 206, and 208. Packet processing modules 204 and 206 require packets of a sequence to be processed in the order in which they arrived at receive element 102. Packet processing modules 202 and 208 do not require packets of a sequence to be processed in order. Therefore, when packets arrive at packet processing module 202, they may be out of order and may be processed out of order. However, when packet processing module 202 is finished processing the packets, and they are sent to processing module 204 or 206, the packets of the sequence are processed in order.

If a packet arrives out of order at processing module 204 or 206, the packet is stored in memory 108. In one embodiment, the packet is stored in an AISR array in memory 108 according to the sequence number. The AISR array is common to the packet processing modules. For example, processing modules 204 and 206 share the same AISR array in memory 108.

To help determine which packet is the next packet in the sequence to be processed by each packet processing module that requires in-order processing, the memory 108 also stores a plurality of indicators for each of these packet processing modules. One type of indicator may specify the last packet in the sequence to be processed by a packet processing module. This indicator is updated each time the packet processing module finishes processing another packet in the sequence. There may also be indicators that specify which packets in the sequence are ready to be processed by a processing module.

For each of the processing modules requiring in-order processing, there are also indicators that specify which packets in the sequence will be processed by the packet processing module and which packets will be skipped. In one embodiment, these indicators are bit vectors. These indicators are updated when a packet in the sequence reaches a location in the system that indicates the packet will not be processed by the packet processing module. For example, suppose a packet in the sequence is processed by processing module 202, then processed by processing module 206, and then sent to processing module 208 to be processed. When the packet reaches packet processing module 208, this is an indication that the packet will not be processed by processing module 204. Therefore, at the time the packet reaches processing module 208, the indicator associated with processing module 204 may be updated to indicate that this particular packet in the sequence may be skipped. In this way, the processing module 204 will not wait for a packet in the sequence that may never arrive.

The following is an example C Struct for a data structure that may be used to implement one embodiment of the invention:

```
typedef struct {
    unsigned int last_seq_no[NUM_BLOCKS],
    bit         status_vector[MAX_SEQ_NO] [NUM_BLOCKS],
    bit         skip_vector[MAX_SEQ_NO] [NUM_BLOCKS];
    pkt_data_t packet_data[MAX_SEQ_NO];
} seq_id_struct_t;
```

FIG. 3 is a table illustrating exemplary entries in a memory according to one embodiment of the invention. In this example, the memory 108 stores an AISR array 310. This is a common array for the processing modules that require in-order processing to store packets in the sequence. The memory 108 also stores two bit vectors for each processing module that requires in-order processing. The status bit vector stores one bit for each packet in the sequence to indicate whether the packet is ready to be processed by the processing module. The skip bit vector stores one bit for each packet in the sequence to indicate whether the packet is to be processed or skipped by the processing module. The memory 108 may also store an integer for each processing module to indicate the last packet in the sequence processed by the processing module. This integer may be the sequence number of the last packet in the sequence that has been processed.

For example, assume that the exemplary memory entries shown in FIG. 3 are the stored indicators for the processing modules shown in FIG. 2. Since processing modules 204 and 206 require in-order processing, they share the common AISR array 310 to store packets that arrive out-of-order. The status bit vectors 320 and 340 are stored to indicate which packets in the sequence are ready to be processed by the processing modules 204 and 206, respectively. The skip bit vectors 330 and 350 are stored to indicate which packets in the sequence are to be processed or skipped by the processing modules 204 and 206, respectively. There may also be an integer (last packet sequence number) stored for each processing module to indicate the sequence number of the last packet in the sequence processed by the processing module.

Assume that there are four packets in the sequence. The first packet in the sequence may be stored in the first position in the array, the second packet in the sequence stored in the second position in the array, and so on. Suppose the second packet in the sequence is processed by processing module 202, and then sent to processing module 206. The status bit vector 340 is updated to indicate that the second packet in the sequence is ready to be processed by processing module 206. The last packet sequence number is checked to determine the last packet in the sequence processed by processing module 206. This number indicates that processing module 206 is waiting for the first packet in the sequence. The skip bit vector 350 is checked to see which packets in the sequence may be skipped. The skip bit vector 350 indicates that the first packet in the sequence is to be processed by processing module 206 and should not be skipped. Therefore, processing module 206 will wait for the first packet in the sequence to arrive. Meanwhile, the second packet in the sequence is stored in the AISR array in memory 108 waiting to be processed.

Suppose the first packet in the sequence arrives at processing module 206. The status bit vector 340 is updated to indicate that the first packet in the sequence is ready to be processed by processing module 206. Packet processing module 206 will process the first packet and update the last packet sequence number to indicate that the last packet in the sequence processed was packet 1. The first packet will then be sent to packet processing module 208. This is an indication that the first packet will not be processed by packet processing module 204. Therefore, the skip bit vector 330 is updated to indicate that the first packet in the sequence should be skipped by processing module 204.

The processing module 206 checks the status bit vector 340, which indicates that the second packet in the sequence is ready to be processed. Therefore, the second packet is retrieved from the AISR array in memory 108 and processed by processing module 206. The last packet sequence number is updated to indicate that the last packet in the sequence processed was packet 2. The second packet will then be sent to packet processing module 208. This is an indication that the second packet will not be processed by packet processing module 204. Therefore, the skip bit vector 330 is updated to indicate that the second packet in the sequence should be skipped by processing module 204.

Suppose the third packet in the sequence arrives at processing module 204. The status bit vector 320 is updated to indicate that the third packet in the sequence is ready to be processed by processing module 204. The last packet sequence number is checked to determine the last packet in the sequence processed by processing module 204. This number indicates that processing module 204 is waiting for the first packet in the sequence. The skip bit vector 330 is checked to see which packets in the sequence may be skipped. The skip bit vector 330 indicates that the first and second packets in the sequence may be skipped. Therefore, the next packet in the sequence to be processed by processing module 204 is the third packet in the sequence. The third packet is ready to be processed, so processing module 204 processes the third packet. The last sequence number is updated to indicate that packet 3 was the last packet in the sequence processed by processing module 204. Then, the third packet is sent to packet processing module 208. This is an indication that the third packet will not be processed by packet processing module 206. Therefore, the skip bit vector 350 is updated to indicate that the third packet in the sequence should be skipped by processing module 206.

Suppose the fourth packet in the sequence arrives at processing module 206. The status bit vector 340 is updated to indicate that the fourth packet in the sequence is ready to be processed by processing module 206. The last packet sequence number is checked. This indicates that packet 2 was the last packet in the sequence to be processed, and processing module 206 is waiting for the third packet in the sequence. The skip bit vector 350 is checked to determine which of the next packets in the sequence may be skipped. The skip bit vector 350 indicates that the third packet in the sequence may be skipped. Therefore, the fourth packet in the sequence is the next packet in the sequence to be processed. The fourth packet in the sequence is ready to be processed, so packet processing module 206 processes this packet. This last packet in the sequence is then sent to processing module 208.

For scheduling and allocation of resources, one or more indicators may be stored to indicate which packet processing modules have at least one packet waiting to be processed (waiting indicator), which packet processing modules have a packet in the right order waiting to be processed (ready indicator), and which packet processing modules have a number of packets waiting to be processed that exceed a predetermined threshold number (threshold indicator). In one embodiment, each of these indicators is a bit vector.

There may also be an integer stored for each processing module that is incremented each time a packet is queued for later processing and decremented each time a packet that has been previously queued is processed. This integer may be used to determine whether the indicators for each processing module should be set or unset. For example, when the integer is non-zero, the waiting indicator may be set to indicate that at least one packet is waiting to be processed. When the integer becomes zero, the waiting indicator may be unset. When the integer exceeds a predetermined threshold number, the threshold indicator may be set to indicate that the number of packets waiting to be processed has exceeded the predetermined threshold. After one or more packets are processed and the integer falls below the predetermined threshold number, the threshold indicator may be unset.

When a processing module has finished processing a packet, it may check the status bit vector of the next packet in the sequence to determine if the next packet is ready for processing. If so, the ready indicator may be set to indicate that the next packet in sequence is waiting to be processed.

These indicators may be used for scheduling available resources. One scheduling method is as follows. First, check to see if any queues have the ready indicator and threshold indicator set. This indicates that the queue has a packet in the right order waiting to be processed and the number of packets waiting in the queue has exceeded the predetermined threshold. Therefore, packets in this queue should be scheduled to be processed first. If there are no such queues, then check to see if any queues have the ready indicator set. If so, process packets in these queues. If not, check to see if any queues have the waiting indicator set. If so, process packets in these queues. If not, then grab a new packet.

Figure 4:
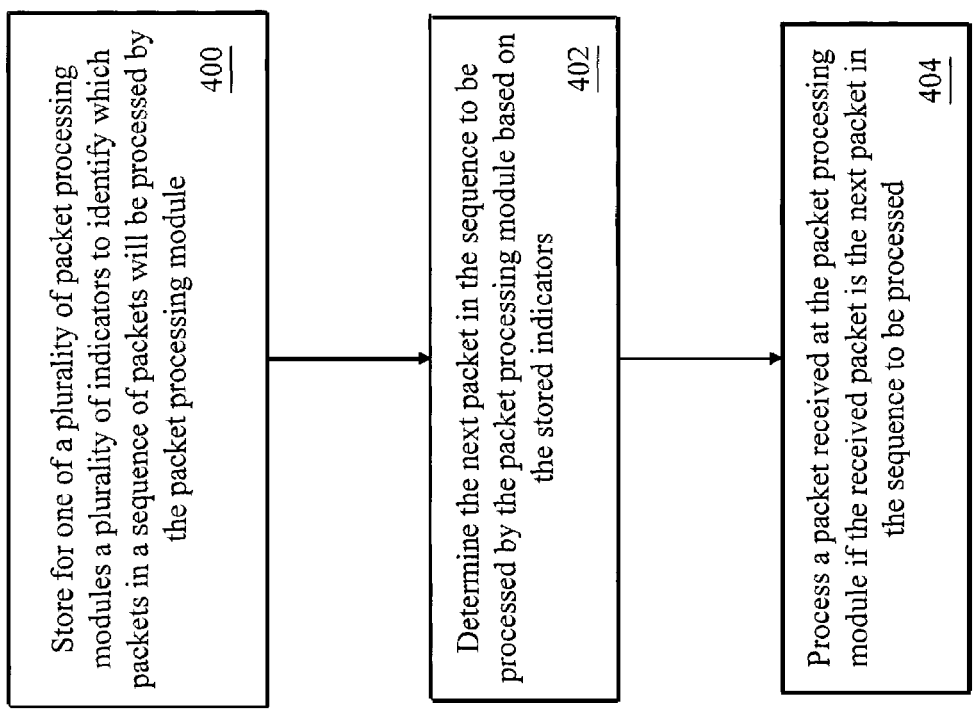
FIG. 4 is a flow diagram illustrating a method according to an embodiment of the invention.

FIG. 4 illustrates a method according to one embodiment of the invention. At 400, a plurality of indicators is stored for one of a plurality of packet processing modules to identify which packets in a sequence of packets will be processed by the packet processing module and which packets in the sequence will be skipped. At 402, a determination is made based on the stored indicators as to which packet in the sequence is the next packet to be processed by the packet processing module. At 404, a packet received at the packet processing module is processed if the received packet is the next packet in the sequence to be processed. In one embodiment, the received packet is stored if the received packet is not the next packet in the sequence to be processed. The stored packet is then retrieved later when the packet is determined to be the next packet in the sequence to be processed.

Figure 5:
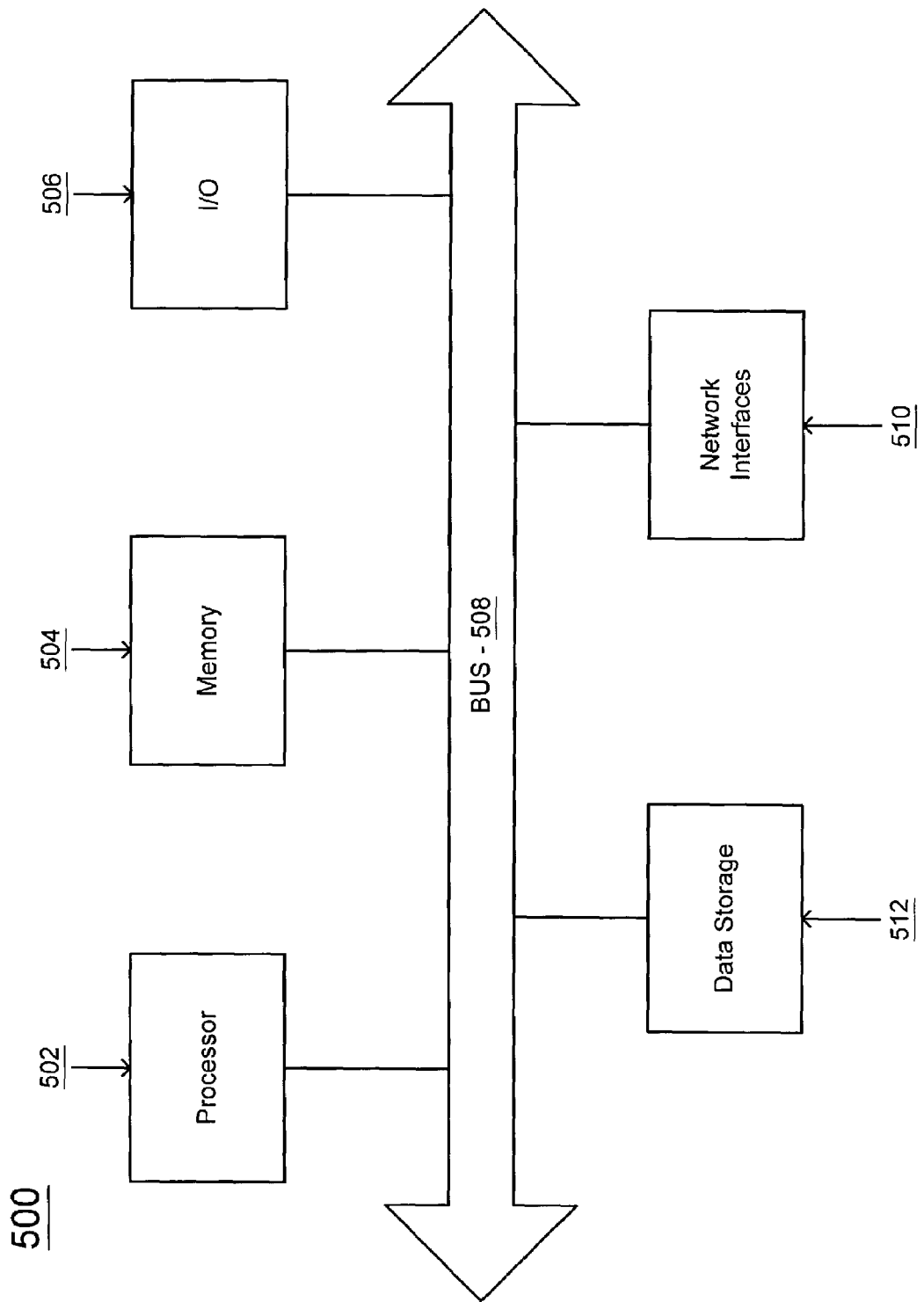
FIG. 5 is a block diagram illustrating a suitable computing environment in which certain aspects of the illustrated invention may be practiced.

FIG. 5 is a block diagram illustrating a suitable computing environment in which certain aspects of the illustrated invention may be practiced. In one embodiment, the method described above may be implemented on a computer system 500 having components 502-512, including a processor 502, a memory 504, an Input/Output device 506, a data storage 512, and a network interface 510, coupled to each other via a bus 508. The components perform their conventional functions known in the art and provide the means for implementing a system incorporating the present invention. Collectively, these components represent a broad category of hardware systems, including but not limited to general purpose computer systems and specialized packet forwarding devices. It is to be appreciated that various components of computer system 500 may be rearranged, and that certain implementations of the present invention may not require nor include all of the above components. Furthermore, additional components may be included in system 500, such as additional processors (e.g., a digital signal processor), storage devices, memories, and network or communication interfaces.

As will be appreciated by those skilled in the art, the content for implementing an embodiment of the method of the invention, for example, computer program instructions, may be provided by any machine-readable media which can store data that is accessible by network processor 100, as part of or in addition to memory, including but not limited to cartridges, magnetic cassettes, flash memory cards, digital video disks, random access memories (RAMs), read-only memories (ROMs), and the like. In this regard, the network processor 100 is equipped to communicate with such machine-readable media in a manner well-known in the art.

It will be further appreciated by those skilled in the art that the content for implementing an embodiment of the method of the invention may be provided to the network processor 100 from any external device capable of storing the content and communicating the content to the network processor 100. For example, in one embodiment of the invention, the network processor 100 may be connected to a network, and the content may be stored on any device in the network.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    storing for a first packet processing module and a second packet processing module a plurality of indicators to identify which packets in a sequence of packets will be processed by the first packet processing module or the second packet processing module;
    determining a next packet in the sequence to be processed by the first packet processing module or the second packet processing module based on the stored indicators;
    processing a packet received at the first packet processing module if the received packet is the next packet in the sequence to be processed; and
    storing a plurality of indicators to specify which packets in the sequence of packets are ready to be processed by the first packet processing module.

2. The method of claim 1, wherein storing for the first packet processing module and the second packet processing module a plurality of indicators to identify which packets in a sequence of packets will be processed by the first packet processing module comprises storing an indicator for each packet in the sequence of packets to indicate whether the packet will be processed by the first packet processing module and skipped by the second packet processing module.

3. The method of claim 2, wherein determining the next packet in the sequence to be processed by the first packet processing module based on the stored indicators comprises determining the last packet in the sequence that has been processed by the first packet processing module and checking the indicator associated with the next packet in the sequence to determine whether the next packet in the sequence should be skipped by the first packet processing module.

4. The method of claim 1, further comprising storing the packet received at the first packet processing module if the received packet is not the next packet in the sequence to be processed.

5. The method of claim 4, wherein storing the received packet if the received packet is not the next packet in the sequence to be processed comprises storing the received packet in an Asynchronous Insert, Synchronous Remove (AISR) array if the received packet is not the next packet in the sequence to be processed.

6. The method of claim 5, further comprising retrieving the stored packet from the AISR array and processing the packet when the packet is determined to be the next packet in the sequence to be processed.

7. The method of claim 1, further comprising storing an indicator to identify whether the first packet processing module has at least one packet waiting to be processed.

8. The method of claim 1, further comprising storing an indicator to identify whether the first packet processing module has a number of packets waiting to be processed that exceeds a predetermined threshold number.

9. An article of manufacture comprising:
    a computer readable medium encoded with computer executable instructions that when accessed by a computer causes the computer to:
    store a first packet processing module and a second packet processing module a plurality of indicators to identify which packets in a sequence of packets will be processed by the first packet processing module or the second packet processing module;
    determine a next packet in the sequence to be processed by the first packet processing module or the second packet processing module based on the stored indicators;
    process a packet received at the first packet processing module if the packet is the next packet in the sequence to be processed; and
    store the packet received at the packet processing module in an Asynchronous Insert, Synchronous Remove (AISR) array if the received packet is not the next packet in the sequence to be processed.

10. The article of manufacture of claim 9, wherein the computer readable medium encoded with computer executable instructions that when accessed by the computer causes the computer to store for the first packet processing module and the second packet processing module a plurality of indicators to identify which packets in a sequence of packets will be processed by the first packet processing module comprises machine accessible medium including content that when accessed by the machine causes the machine to store an indicator for each packet in the sequence of packets to indicate whether the packet will be processed by the first packet processing module and skipped by the second packet processing module.

11. The article of manufacture of claim 10, wherein the computer readable medium encoded with computer executable instructions that when accessed by the computer causes the computer to be processed by the first packet processing module based on the stored indicators comprises machine accessible medium including content that when accessed by the machine causes the machine to determine the last packet in the sequence processed by the first packet processing module and to check the indicator associated with the next packet in the sequence to determine whether the next packet in the sequence should be skipped by the first packet processing module.

12. The article of manufacture of claim 9, wherein the computer readable medium encoded with computer executable instructions that when accessed by the computer causes the computer to retrieve the stored packet from the AISR away and process the packet when the packet is determined to be the next packet in the sequence to be processed.

* * * * *